(12) United States Patent
Lippert

(10) Patent No.: US 9,464,692 B2
(45) Date of Patent: Oct. 11, 2016

(54) MULTI-SPEED TRANSMISSION

(71) Applicant: FORD GLOBAL TECHNOLOGIES, LLC., Dearborn, MI (US)

(72) Inventor: Robert Scott Lippert, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 171 days.

(21) Appl. No.: 14/178,745

(22) Filed: Feb. 12, 2014

(65) Prior Publication Data

US 2015/0226290 A1 Aug. 13, 2015

(51) Int. Cl.
*F16H 3/62* (2006.01)
*F16H 3/66* (2006.01)

(52) U.S. Cl.
CPC .......... *F16H 3/66* (2013.01); *F16H 2200/0026* (2013.01); *F16H 2200/0069* (2013.01); *F16H 2200/0082* (2013.01); *F16H 2200/2012* (2013.01); *F16H 2200/2046* (2013.01)

(58) Field of Classification Search
CPC ............. F16H 3/66; F16H 2200/0026; F16H 2200/2046; F16H 2200/2012; F16H 2200/0069; F16H 2200/0082
See application file for complete search history.

(56) References Cited

U.S. PATENT DOCUMENTS

| | | | |
|---|---|---|---|
| 6,652,409 B2 | 11/2003 | Kao et al. | |
| 6,672,987 B1 | 1/2004 | Raghavan et al. | |
| 6,712,731 B1 | 3/2004 | Raghavan et al. | |
| 6,723,019 B2 | 4/2004 | Lee et al. | |
| 8,052,566 B2* | 11/2011 | Wittkopp | F16H 3/66 475/275 |
| 8,052,567 B2* | 11/2011 | Hart | F16H 3/66 475/282 |
| 8,303,455 B2* | 11/2012 | Gumpoltsberger | F16H 3/66 475/280 |
| 8,403,803 B2* | 3/2013 | Gumpoltsberger | F16H 3/66 475/276 |
| 2011/0045939 A1* | 2/2011 | Gumpoltsberger | F16H 3/66 475/275 |
| 2011/0045941 A1* | 2/2011 | Gumpoltsberger | F16H 3/66 475/275 |
| 2011/0045943 A1* | 2/2011 | Gumpoltsberger | F16H 3/66 475/275 |
| 2013/0316870 A1* | 11/2013 | Goleski | F16H 3/62 475/275 |

* cited by examiner

*Primary Examiner* — David J Hlavka
(74) *Attorney, Agent, or Firm* — James J. Dottavio; Brooks Kushman P.C.

(57) ABSTRACT

A family of transmission gearing arrangements provides ten forward speed ratios and one reverse speed ratios by selective engagement of shift elements in various combinations. Four simple planetary gear sets are provided, each having a sun gear, a planet carrier, and a ring gear. One carrier is coupled to the input. At least one planetary gear set provides an underdrive speed relationship between a shaft extending from the carriers of that gear set and the output. At least two brakes and four clutches provide selective coupling between other shafts in the transmission.

20 Claims, 3 Drawing Sheets

MULTI-SPEED TRANSMISSION

TECHNICAL FIELD

The present disclosure generally relates to automatic transmission for motor vehicles. More specifically, the present disclosure relates to an arrangement of gears, clutches, and the interconnections among them in a power transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input driven by an engine crankshaft, often via a launch device such as a torque converter, and an output driving the vehicle wheels, often via a differential assembly which permits the left and right wheel to rotate at slightly different speeds as the vehicle turns. In front wheel drive vehicles with transverse mounted engines, the engine crankshaft axis is typically offset from the axle axis.

A common type of automatic transmission utilizes a collection of clutches and brakes. Various subsets of the clutches and brakes are engaged to establish the various speed ratios. A common type of clutch utilizes a clutch pack having separator plates splined to a housing and interleaved with friction plates splined to a rotating shell. When the separator plates and the friction plates are forced together, torque may be transmitted between the housing and the shell. Typically, a separator plate on one end of the clutch pack, called a reaction plate, is axially held to the housing. A piston applies axial force to a separator plate on the opposite end of the clutch pack, called a pressure plate, compressing the clutch pack. The piston force is generated by supplying pressurized fluid to a chamber between the housing and the piston. For a brake, the housing may be integrated into the transmission case. For a clutch, the housing rotates. As the pressurized fluid flows from the stationary transmission case to the rotating housing, it may need to cross one or more interfaces between components rotating at different speeds. At each interface, seals direct the flow from an opening in one component into an opening in the interfacing component.

SUMMARY

According to one embodiment, a transmission comprises an input, an output, three gearing arrangements, three clutches, and two brakes. The first gearing arrangement is configured to fixedly establish a linear sped relationship among a first shaft, the input and a second shaft. The second gearing arrangement is configured to fixedly establish a linear speed relationship among the second shaft, a third shaft, a fourth shaft, and a fifth shaft. The third gearing arrangement is configured to selectively establish an underdrive speed relationship between the forth shaft and the output. The three clutches are each configured to selectively couple one of the first through fifth shafts to either another of the first through fifth shafts, the input, or the output. The two brakes are each configured to selectively hold one of the first through fifth shafts against rotation.

In another embodiment, a transmission includes an input, an output, first through fourth gearing arrangements, a first brake, and first through third clutches. The first gearing arrangement is configured to fixedly establish a linear speed relationship among a first shaft, the input, and a second shaft. The second gearing arrangement is configured to fixedly establish a linear speed relationship among the second shaft, a third shaft, and a fourth shaft. The third gearing arrangement is configured to selectively establish an underdrive speed relationship between the second shaft and the fourth shaft. The fourth gearing arrangement is configured to selectively establish an underdrive speed relationship between the fourth shaft and the output. The first brake is configured to selectively hold the first shaft against rotation. The first clutch is configured to selectively couple the first shaft to the third shaft. The second clutch is configured to selectively couple the input to the third shaft. The third clutch is configured to selectively couple the second shaft to the output.

According to another embodiment, a transmission includes an input, an output, first through third gearing arrangements, first and second brakes, and first through third clutches. The first gearing arrangement is configured to fixedly establish a linear speed relationship among a first shaft, the input and a second shaft. The second gearing arrangement is configured to fixedly establish a linear speed relationship among the second shaft, a third shaft, a fourth shaft, and a fifth shaft. The third gearing arrangement is configured to selectively establish an underdrive speed relationship between the fourth shaft and the output. The first brake is configured to selectively hold the first shaft against rotation. The second brake is configured to selectively hold the fifth shaft against rotation. The first clutch is configured to selectively couple the first shaft to the third shaft. The second clutch is configured to selectively hold the fifth shaft against rotation. The third clutch is configured to selectively couple the second shaft to the output.

In any embodiment, each gearing arrangement may include one or more planetary gear set that comprises a sun gear, a planet carrier, and a ring gear. The shafts fixedly couple one part of one planetary gear set to another part of another planetary gear set. The clutches can, when activated, engage shafts to one another.

DETAILED DESCRIPTION

Figure 1:
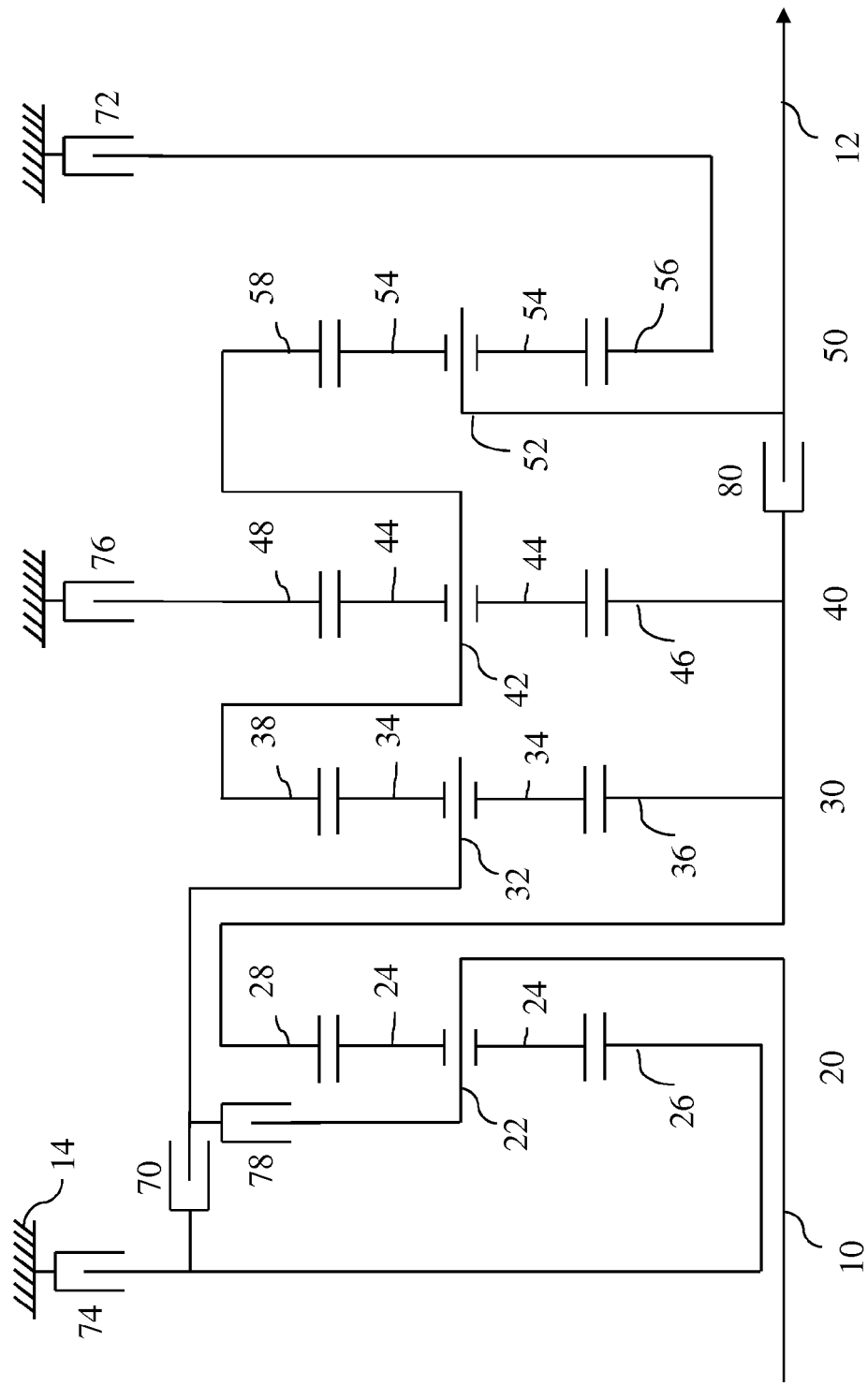
FIG. 1 is a schematic diagram of a first transmission gearing arrangement.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A gearing arrangement is a collection of rotating elements and shift elements configured to impose specified speed relationships among the rotating elements. Some speed relationships, called fixed speed relationships, are imposed regardless of the state of any shift elements. Other speed relationships, called selective speed relationships, are imposed only when particular shift elements are fully engaged. A linear speed relationship exists among an ordered list of rotating elements when i) the first and last rotating element in the group are constrained to have the most extreme speeds, ii) the speeds of the remaining rotating elements are each constrained to be a weighted average of the first and last rotating element, and iii) when the speeds of the rotating elements differ, they are constrained to be in the listed order, either increasing or decreasing. The speed of an element is positive when the element rotates in one direction and negative when the element rotates in the opposite direction. A proportional speed relationship between two elements when the ratio between the speeds of the elements is a predetermined value. A proportional speed relationship between a first element and a second element is an overdrive relationship if the second element always rotates faster than and in the same direction as the first element. Similarly, a proportional speed relationship between a first element and a second element is an underdrive relationship if the second element always rotates slower than and in the same direction as the first element.

A group of rotating elements are fixedly coupled to one another if they are constrained to rotate as a unit in all operating conditions. Rotating elements can be fixedly coupled by spline connections, welding, press fitting, machining from a common solid, or other means. Slight variations in rotational displacement between fixedly coupled elements can occur such as displacement due to lash or shaft compliance. One or more rotating elements that are all fixedly coupled to one another may be called a shaft. In contrast, two rotating elements are selectively coupled by a shift element when the shift element constrains them to rotate as a unit whenever it is fully engaged and they are free to rotate at distinct speeds in at least some other operating condition. A shift element that holds a rotating element against rotation by selectively connecting it to the housing is called a brake. A shift element that selectively couples two or more rotating elements to one another is called a clutch. Shift elements may be actively controlled devices such as hydraulically or electrically actuated clutches or brakes or may be passive devices such as one way clutches or brakes. Two rotating elements are coupled if they are either fixedly coupled or selectively coupled.

An element is a transmission input if it is adapted to be fixedly coupled to either a power source or the output of a launch device. A power source may be, for example, an internal combustion engine or an electric motor. A launch device may be, for example, a torque converter or a launch clutch. The input may be coupled to the power source or launch device via a damper designed to absorb torsional vibrations. An element is a transmission output if it is adapted to transmit power to components outside the transmission such as vehicle wheels. There may be a fixed speed ratio other than 1:1 between the output element and the driven component.

An example transmission is schematically illustrated in FIG. 1. In this transmission, input 10 is driven by the engine, preferably via a launch device such as a torque converter or launch clutch. Output 12 transmits rotational torque out of the transmission and towards a differential, for example.

The transmission of FIG. 1 utilizes four simple planetary gear sets 20, 30, 40, and 50. A simple planetary gear set is a type of fixed gearing arrangement. A planet carrier 22 rotates about a central axis and supports a set of planet gears 24 such that the planet gears rotate with respect to the planet carrier. External gear teeth on the planet gears mesh with external gear teeth on a sun gear 26 and with internal gear teeth on a ring gear 28. The sun gear and ring gear are supported to rotate about the same axis as the carrier. Gear sets 30 and 40 are similarly structured, each with respective planet carriers 32, 42, planet gears 34, 44, sun gears 36, 46, and ring gears 38, 48. In each simple planetary gear set, a fixed linear speed relationship exists among the sun gear, the planet carrier, and the ring gear.

A simple planetary gear set imposes a fixed speed relationship. The speed of the carrier is constrained to be between the speed of the sun gear and the speed of the ring gear. More specifically, the speed of the carrier is a weighted average of the speed of the sun gear and the speed of the ring gear with weighting factors determined by the number of teeth on each gear. Similar speed relationships are imposed by other known types of fixed gearing arrangements that may be implemented in other exemplary embodiments of the present disclosure. For example, a double pinion planetary gear set constrains the speed of the ring gear to be a weighted average between the speed of the sun gear and the speed of the carrier.

A suggested ratio of gear teeth for each planetary gear set is listed in Table 1, below.

TABLE 1

| | |
|---|---|
| Ring 28/Sun 26 | 2.208 |
| Ring 38/Sun 36 | 3.442 |
| Ring 48/Sun 46 | 3.065 |
| Ring 58/Sun 56 | 1.475 |

As illustrated in FIG. 1, input 10 is fixedly coupled to planet carrier 22. Ring gear 28 is fixedly coupled to sun gears 36 and 46. Ring gear 38 is fixedly coupled to planet carrier 42 and ring gear 58. Planet carrier 42 is fixedly coupled to output 12.

Several shift elements such as clutches and brakes are utilized throughout the transmission to selectively couple various elements of the planetary gear sets and/or selectively hold the various elements against rotation. For example, sun gear 26 is configured to be selectively coupled to planet carrier 32 by clutch 70. Sun gear 56 is selectively held against rotation by brake 72 because brake 72 is connected to the transmission case 14. Similarly, sun gear 26 is selectively held against rotation by brake 74, and ring gear 48 is selectively held against rotation by brake 76. Planet carrier 22 is selectively coupled to planet carrier 32 by clutch 78. Ring gear 28, along with sun gears 36 and 46, are selectively coupled to output 12 and planet carrier 52 by clutch 80. When two clutches are activated and engaged, a plurality of shafts may be coupled together. For example, in one embodiment, a shaft connecting planet carrier 32 and sun gear 26 is held against rotation by the activation and engagement of clutch 70 and brake 74 because brake 74 is connected to the transmission case 14. In another embodiment, when clutch 70 is engaged and clutch 74 is not engaged, planet carrier 32 and sun gear 26 are connected to one another but are not held against rotation.

As shown in Table 2 below, engaging shift elements in combinations of three establishes ten forward speed ratios and one reverse speed ratios between input 10 and output 12. An "X" indicates that the shift element is required to establish the speed ratio. When the gear sets have tooth numbers as indicated in Table 1, the speed ratios have the values indicated in Table 2.

TABLE 2

|  | 70 | 72 | 74 | 76 | 78 | 80 | Ratio | Step |
|---|---|---|---|---|---|---|---|---|
| Rev | X | X | X |  |  |  | −4.162 | 87.2% |
| Low | X | X |  | X |  |  | 5.645 | 0.124 |
| $1^{st}$ |  | X | X | X |  |  | 4.772 |  |
| $2^{nd}$ |  | X |  | X | X |  | 2.889 | 1.652 |
| $3^{rd}$ |  | X | X |  | X |  | 1.989 | 1.452 |
| $4^{th}$ | X | X |  |  | X |  | 1.738 | 1.144 |
| $5^{th}$ |  | X |  |  | X | X | 1.571 | 1.106 |
| $6^{th}$ | X | X |  |  |  | X | 1.173 | 1.640 |
| $7^{th}$ | X |  |  |  | X | X | 1.000 | 1.173 |
| $8^{th}$ | X |  |  | X |  | X | 0.825 | 1.212 |
| $9^{th}$ |  |  | X | X |  | X | 0.698 | 1.183 |

While a 10-speed transmission is exemplified in Table 2 along with the description provided above, it should be understood that a 7-speed transmission can be achieved by removing, for example, clutch 72 and replacing it with a fixed ground connection. Other such alterations to the 10-speed transmission are contemplated, and the 10-speed configuration is merely exemplary.

Figure 2:
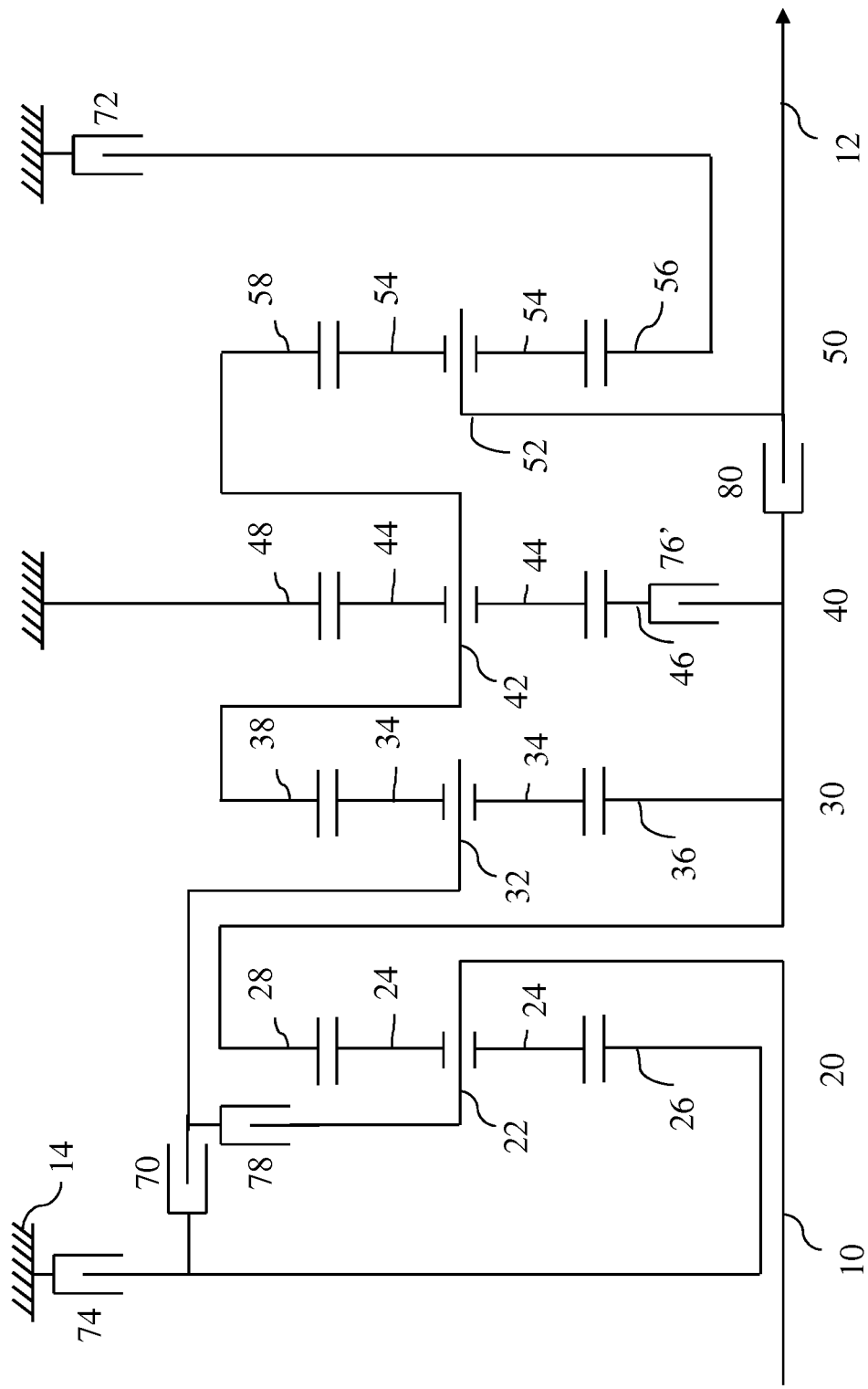
FIG. 2 is a schematic diagram of a second transmission gearing arrangement.

FIG. 2 illustrates an exemplary transmission similar to that of FIG. 1. In FIG. 2, brake 76 has been replaced with clutch 76'. Instead of selectively holding ring gear 48 against rotation (as is the case in FIG. 1), clutch 76' selectively couples sun gear 46 to the shaft that connects sun gear 36 and ring gear 28. Ring gear 48 is now fixedly held against rotation via a connection to the transmission housing 14. The two sun gears 36 and 46 are no longer fixedly connected via a shaft, but instead are selectively coupled via clutch 76'. Such an arrangement may be beneficial for packaging reasons or to reduce the amount of brakes in the transmission, for example.

Figure 3:
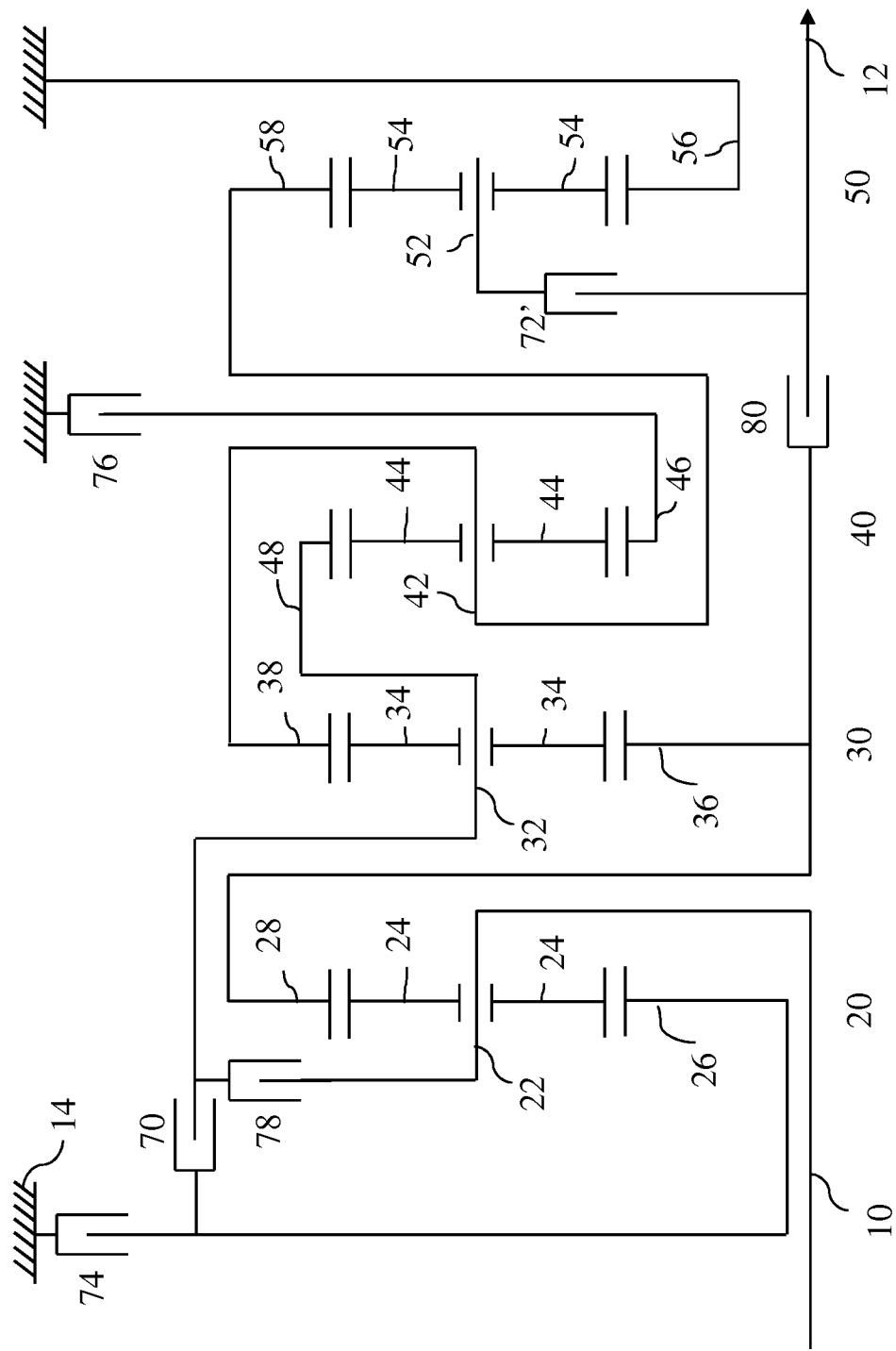
FIG. 3 is a schematic diagram of a third transmission gearing arrangement.

FIG. 3 illustrates another exemplary transmission according to the present disclosure. Connections between planetary gear sets 30 and 40 have changed compared to the shaft connections of FIGS. 1 and 2. In particular, planet carrier 32 is fixedly coupled to ring gear 48 such that activation and engagement of clutch 70 couples planet carrier 32 and ring gear 48 to sun gear 26. Additionally, sun gear 46 is selectively held against rotation by brake 76. Also in FIG. 3, brake 72 brake 72 has been replaced by clutch 72'. Instead of selectively holding sun gear 56 against rotation (as is the case in FIGS. 1-2), clutch 72' selectively couples planet carrier 52 to output 12.

A suggested ratio of gear teeth for each of the planetary gear sets of FIGS. 2 and 3 is again listed in Table 1, above. Similarly, the gear shift table as illustrated in Table 2 can be applied to the transmission gearing arrangements of FIGS. 2-3.

It should be understood that the replacement of brake 76 with clutch 76' in the transmission of FIG. 2 can also be made in the transmission of FIG. 3 instead of or in combination with the replacement of brake 72 with clutch 72'. Similarly, the replacement of brake 72 with clutch 72' in the transmission of FIG. 3 can also be made in the transmission of FIG. 2 instead of or in combination with the replacement of brake 76 with clutch 76'.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A transmission comprising:
   an input;
   an output;
   a first gearing arrangement configured to fixedly establish a linear speed relationship among a first shaft, the input, and a second shaft;
   a second gearing arrangement configured to fixedly establish a linear speed relationship among the second shaft, a third shaft, a fourth shaft, and a fifth shaft;
   a third gearing arrangement configured to selectively establish an underdrive speed relationship between the fourth shaft and the output;
   three clutches, each clutch configured to directly selectively couple one of the first through fifth shafts to either (i) another of the first through fifth shafts, (ii) the input, or (iii) the output; and
   two brakes, each brake configured to selectively hold one of the first through fifth shafts against rotation.

2. The transmission of claim 1, further comprising a third brake configured to selectively hold the fifth shaft against rotation.

3. The transmission of claim 1, wherein the first gearing arrangement includes:
   a first sun gear fixedly coupled to the first shaft,
   a first carrier fixedly coupled to the input, and
   a first ring gear fixedly coupled to the second shaft.

4. The transmission of claim 3, wherein one of the brakes is configured to selectively hold the first shaft against rotation.

5. The transmission of claim 1, wherein the second gearing arrangement includes:
   second and third sun gears fixedly coupled to the second shaft,
   a second carrier fixedly coupled to the third shaft, a second ring gear and a third carrier fixedly coupled to the fourth shaft, and a third ring gear.

6. The transmission of claim 1, wherein the second gearing arrangement includes:
   a second sun gears fixedly coupled to the second shaft,
   a second carrier and third ring gear fixedly coupled to the third shaft,
   a second ring gear and a third carrier fixedly coupled to the fourth shaft, and
   a third sun gear fixedly coupled to the fifth shaft.

7. The transmission of claim 6, further comprising a third brake configured to selectively hold the fifth shaft against rotation.

8. The transmission of claim 6, wherein one of the clutches is configured to selectively couple the second shaft to the output.

9. The transmission of claim 1, wherein one of the clutches is configured to selectively couple the first shaft to the third shaft.

10. The transmission of claim 1, wherein one of the clutches is configured to selectively couple the input to the third shaft.

11. The transmission of claim 1, wherein the third gearing arrangement includes:
    a sun gear selectively held against rotation by one of the two brakes,
    a carrier fixedly coupled to the output, and
    a ring gear fixedly coupled to the fourth shaft.

12. A transmission comprising:
    an input;
    an output;
    a first gearing arrangement configured to fixedly establish a linear speed relationship among a first shaft, the input, and a second shaft;
    a second gearing arrangement configured to fixedly establish a linear speed relationship among the second shaft, a third shaft, and a fourth shaft;
    a third gearing arrangement configured to selectively establish an underdrive speed relationship between the second shaft and the fourth shaft;
    a fourth gearing arrangement configured to selectively establish an underdrive speed relationship between the fourth shaft and the output;
    a first brake configured to selectively hold the first shaft against rotation;
    a first clutch configured to directly selectively couple the first shaft to the third shaft;
    a second clutch configured to directly selectively couple the input to the third shaft; and
    a third clutch configured to directly selectively couple the second shaft to the output.

13. The transmission of claim 12, further comprising a second brake configured to selectively hold a ring gear of the third gearing arrangement against rotation.

14. The transmission of claim 12, further comprising a second brake configured to selectively hold a sun gear of the third gearing arrangement against rotation.

15. The transmission of claim 12, further comprising a third brake configured to selectively hold a sun gear of the fourth gearing arrangement against rotation.

16. The transmission of claim 12, further comprising a fifth shaft and a fourth clutch configured to selectively couple the fifth shaft to the second shaft.

17. The transmission of claim 12, further comprising a fifth shaft and a second brake configured to selectively hold the fifth shaft against rotation.

18. The transmission of claim 12, wherein the third gearing arrangement includes:
    a third sun gear fixedly coupled to the second shaft,
    a third carrier fixedly coupled to the fourth shaft, and
    a third ring gear selectively held against rotation by a second brake.

19. A transmission comprising:
    an input;
    an output;
    a first gearing arrangement configured to fixedly establish a linear speed relationship among a first shaft, the input, and a second shaft;
    a second gearing arrangement configured to fixedly establish a linear speed relationship among the second shaft, a third shaft, a fourth shaft, and a fifth shaft;
    a third gearing arrangement configured to selectively establish an underdrive speed relationship between the fourth shaft and the output;
    a first brake configured to selectively hold the first shaft against rotation;
    a second brake configured to selectively hold the fifth shaft against rotation;
    a first clutch configured to selectively couple the first shaft to the third shaft;
    a second clutch configured to selectively couple the input to the third shaft; and
    a third clutch configured to selectively couple the second shaft to the output.

20. The transmission of claim 19, further comprising a third brake configured to selectively hold a sun gear of the third gearing arrangement against rotation.

* * * * *